United States Patent [19]

Akiyama

[11] Patent Number: 5,524,049
[45] Date of Patent: Jun. 4, 1996

[54] PERSONAL-SERVICING COMMUNICATION SYSTEM

[75] Inventor: Tadahiko Akiyama, Koriyama, Japan

[73] Assignee: Nippon Communication Industrial Co., Ltd., Fukushima-ken, Japan

[21] Appl. No.: 371,772

[22] Filed: Jan. 12, 1995

Related U.S. Application Data

[63] Continuation of Ser. No. 908,181, Jul. 1, 1992, Pat. No. 5,440,625, which is a continuation of Ser. No. 557,750, Jul. 26, 1990, Pat. No. 5,153,906, which is a continuation of Ser. No. 173,673, Mar. 25, 1988, Pat. No. 4,961,217, which is a continuation of Ser. No. 669,797, Nov. 9, 1984, Pat. No. 4,759,056.

[30] Foreign Application Priority Data

| Nov. 11, 1983 | [JP] | Japan | 58-210928 |
| Nov. 11, 1983 | [JP] | Japan | 58-210930 |
| Nov. 11, 1983 | [JP] | Japan | 58-210931 |
| Nov. 11, 1983 | [JP] | Japan | 58-210933 |

[51] Int. Cl.$^6$ ............................ H04M 1/56; H04M 3/42
[52] U.S. Cl. .................. 379/216; 379/201; 379/244; 379/354; 379/357
[58] Field of Search ........................... 379/357, 355, 379/354, 396, 201, 91, 144, 216, 199, 200, 244, 245

[56] References Cited

U.S. PATENT DOCUMENTS

| 3,588,365 | 6/1971 | McNeilly | 379/211 |
| 4,045,619 | 8/1977 | Harrington | 379/200 |
| 4,187,498 | 2/1980 | Creekmore | 379/91 X |
| 4,355,207 | 10/1982 | Curtin | 379/67 |
| 4,473,720 | 9/1984 | Hegi | 379/354 |
| 4,518,824 | 5/1985 | Mondardini | 379/144 |
| 4,535,204 | 8/1985 | Hughes et al. | 379/355 |
| 4,595,983 | 6/1986 | Gehalo et al. | 379/36 |
| 4,625,276 | 11/1986 | Benton et al. | 379/357 X |
| 4,677,657 | 6/1987 | Nagata et al. | 379/63 |
| 4,680,785 | 7/1987 | Akiyama et al. | 379/57 |
| 4,759,056 | 6/1988 | Akiyama | 379/197 |
| 4,817,136 | 3/1989 | Rhoads | 379/357 |
| 4,961,217 | 10/1990 | Akiyama | 379/89 |

FOREIGN PATENT DOCUMENTS

| 2302450 | 7/1974 | Germany . | |
| 2538820 | 3/1977 | Germany | 379/142 |
| 2832850 | 2/1980 | Germany . | |
| 3245203 | 3/1984 | Germany . | |
| 54-30703 | 3/1979 | Japan . | |
| 0133164 | 10/1980 | Japan | 379/357 |
| 56-17556 | 2/1981 | Japan . | |
| 56-140793 | 11/1981 | Japan | 379/244 |
| 0111468 | 7/1983 | Japan | 379/357 |
| 0165457 | 9/1983 | Japan | 379/357 |
| 58-164363 | 9/1983 | Japan | 379/244 |
| 0163942 | 9/1984 | Japan | 379/357 |
| 0165552 | 9/1984 | Japan | 379/357 |

OTHER PUBLICATIONS

"Smart credit cards: the answer to cashless shopping", Stephen B. Weinstein, *IEEE Spectrum*, Feb. 1984, pp. 43–49.

*Primary Examiner*—Thomas W. Brown
*Attorney, Agent, or Firm*—Antonelli, Terry, Stout & Kraus

[57] ABSTRACT

A communication system offering specific services to specific persons bears a portable memory device with a record of personal information such as the bearer's identification number, class of service, personal data, etc. In making a call, the bearer of the memory device puts it on a communication terminal device and the terminal device reads out the personal information, which is transferred to a data processor such as a central processor in the exchange so that a service specific to the calling person is rendered.

6 Claims, 11 Drawing Sheets

FIG. I

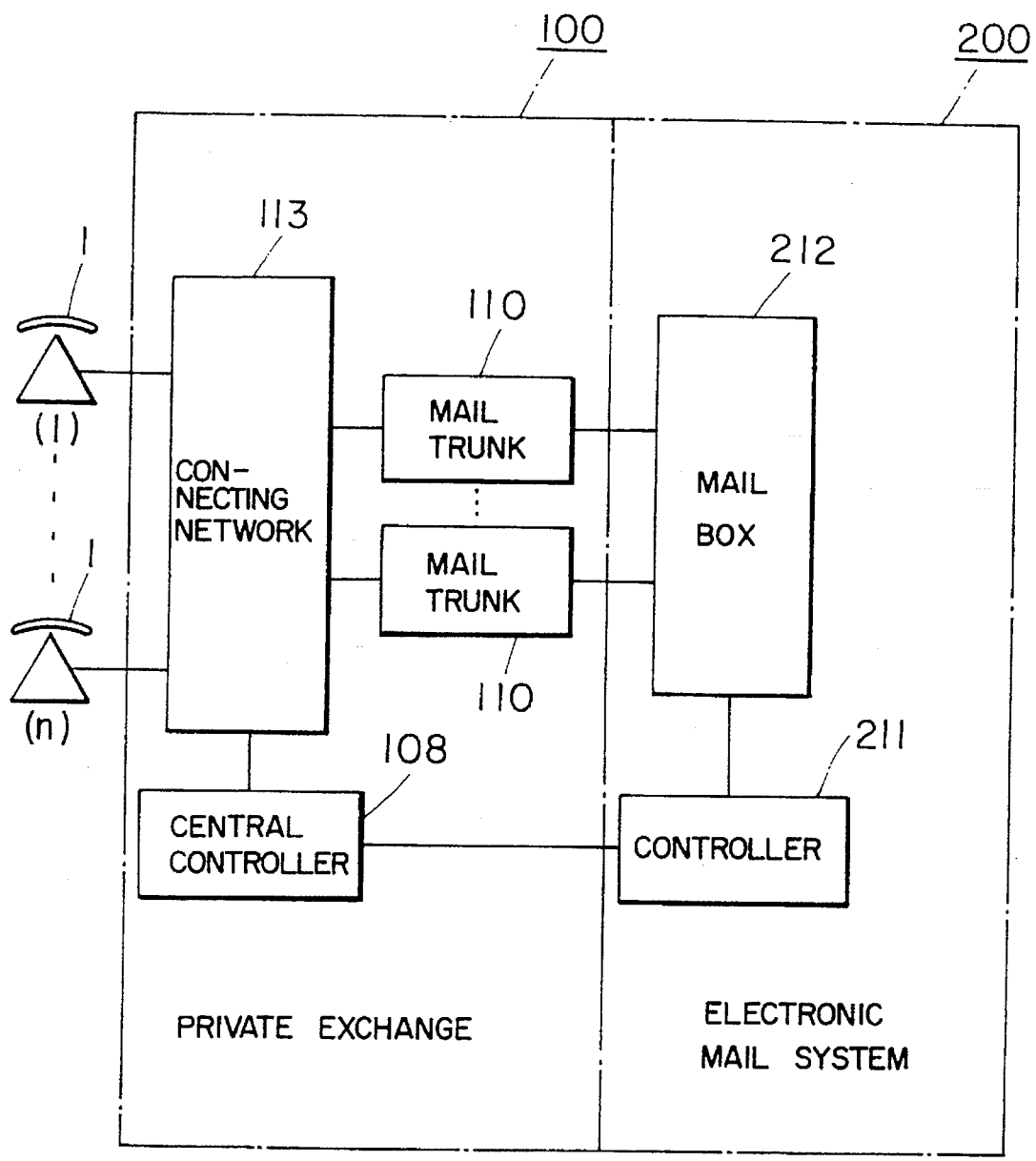

PERSONAL-SERVICING COMMUNICATION SYSTEM

This application is a continuation of application Ser. No. 908,181, filed Jul. 1, 1992, now U.S. Pat. No. 5,440,625, issued Aug. 8, 1995, which is a continuation of application Ser. No. 557,750, filed Jul. 26, 1990, now U.S. Pat. No. 5,153,906, issued Oct. 6, 1992, which is a continuation of application Ser. No. 173,673, filed Mar. 25, 1988, now U.S. Pat. No. 4,961,217, issued Oct. 2, 1990, which is a continuation of application of application Ser. No. 669,797, filed Nov. 9, 1984, now U.S. Pat. No. 4,759,056, issued Jul. 19, 1988.

BACKGROUND OF THE INVENTION

The present invention relates to a personal-servicing communication system intended to render individual person oriented services, that are demanded in the ever advancing communication servicing field, rather than terminal device oriented services.

As for the telephone system, there have been established modified forms of servicing dealing with individual telephone instruments, such as seen in a private telephone system with classes of service for the connection to the public networks. In such, a system, when a person uses a telephone instrument which belongs to another person, only a service classified for that telephone instrument is granted, and therefore it is a device oriented service rather than a person oriented service. Telephone fees are also charged to each telephone instrument, and not to the individual person.

The abbreviated dialling and automatic dialling services are currently assigned to specific telephone instruments, although the purpose of these services is personally oriented.

Furthermore, the conventional communication systems are based on a station-to-station concept. In the telephone system, for example, displaying the calling party's telephone number is practiced tentatively in some areas, but this system solely displays on the called telephone instrument a number assigned to the calling telephone instrument. However, any telephone instrument is not necessarily used by a specific person, and therefore the displayed number does not uniquely identify the calling person.

SUMMARY OF THE INVENTION

An object of the present invention is to provide a personal-servicing communication system wherein a person using the system carries a portable memory device in which personal information is stored, and in operation the person sets the memory device on an unspecified communication terminal device, which reads the personal information on the memory device and renders the personally available service.

Another object of the invention is to provide a personal-servicing telephone system wherein a person using the system carries a portable memory device in which personal information is stored, and in operation the person sets the memory device on an unspecified automatic dialling unit or telephone instrument, which reads the personal information on the memory device and allows the person to make a call by automatic dialling or abbreviated dialling.

Still another object of the invention is to provide a telephone system in which a called party is informed of the name of a calling person, instead of the directory number of a terminal device such as a number assigned to the telephone instrument.

In order to achieve the foregoing objectives, the inventive personal-servicing communication system comprises a portable memory device, such as a punched card, magnetic card, electronic memory card, optical memory card, hand-held computer, and the like, to be carried by the user whose personal information, such as the personal identification number, class of service, personal data, personal program, and so on, is recorded on the memory device, a communication terminal device which reads the personal information recorded on the memory device when it is set by the bearer of the device, and an exchange facility which allows the calling person to be connected to a communication controller, data base or data processor in the communication network so as to render a personally available service defined in the personal information retrieved from the portable memory device.

BRIEF DESCRIPTION OF THE DRAWINGS

The invention will now be further described in conjunction with the accompanying drawings, in which:

FIG. 8 is a block diagram showing the connection between the private exchange and the mail system.

DETAILED DESCRIPTION OF THE PREFERRED EMBODIMENTS

Figure 1:
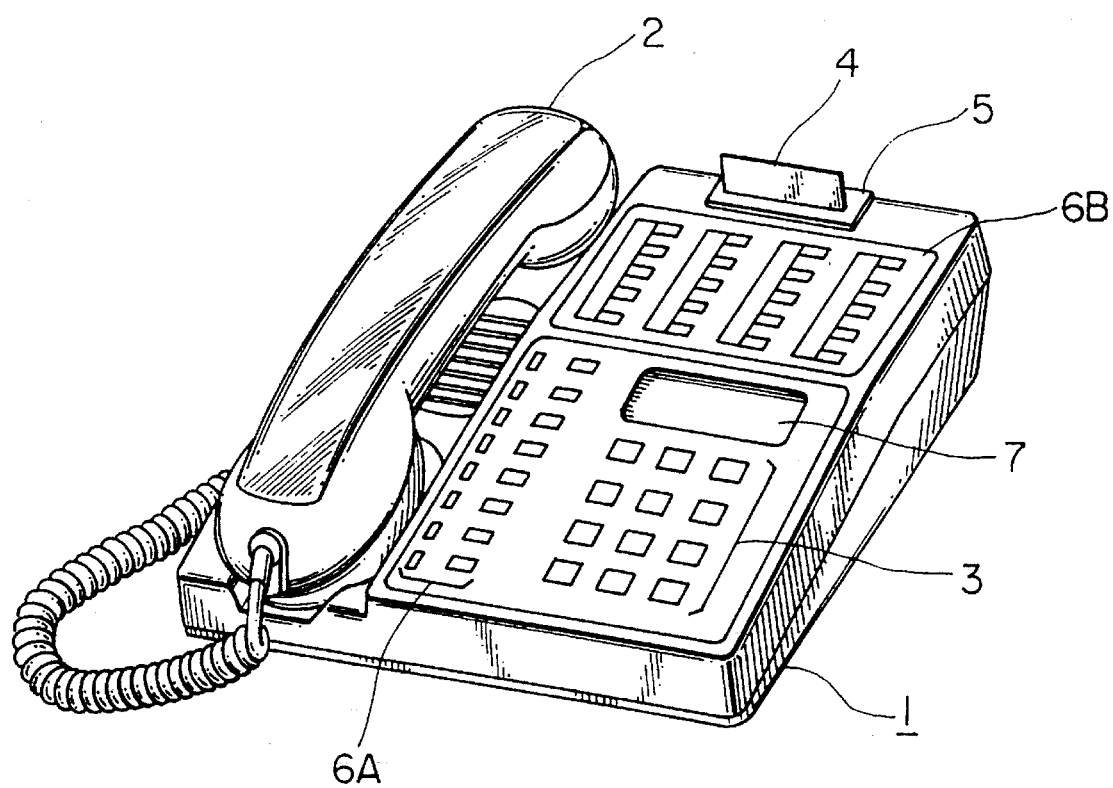
FIG. 1 is a perspective view of the telephone terminal device embodying the present invention.

The first practical embodiment of the present invention dealing with the class of service and charging in connecting a private telephone system to the trunk will be described. The telephone terminal device 1 shown in FIG. 1 includes a handset 2, a push-button dial 3, a magnetic card reader 5 for reading a portable memory device 4 in the form of a magnetic card, key-lamp panels 6A, 6B and a display panel 7. The portable memory device 4 has a record of bearer's identification number, and the record is read by the telephone terminal device 1 when the card 4 is inserted in its magnetic card reader 5.

Figure 2:
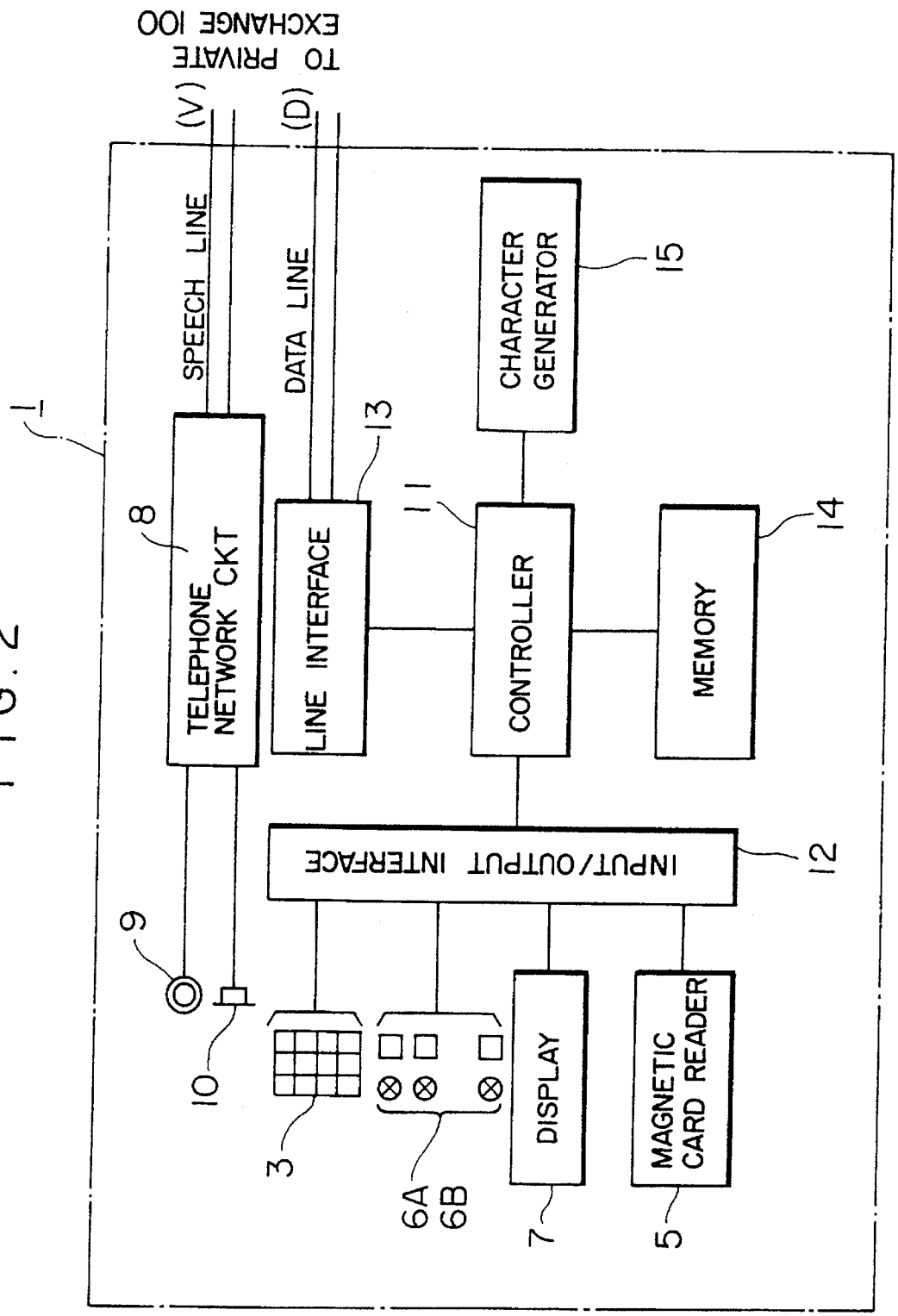
FIG. 2 is a block diagram showing the internal arrangement of the telephone terminal device shown in FIG. 1.
Figure 3:
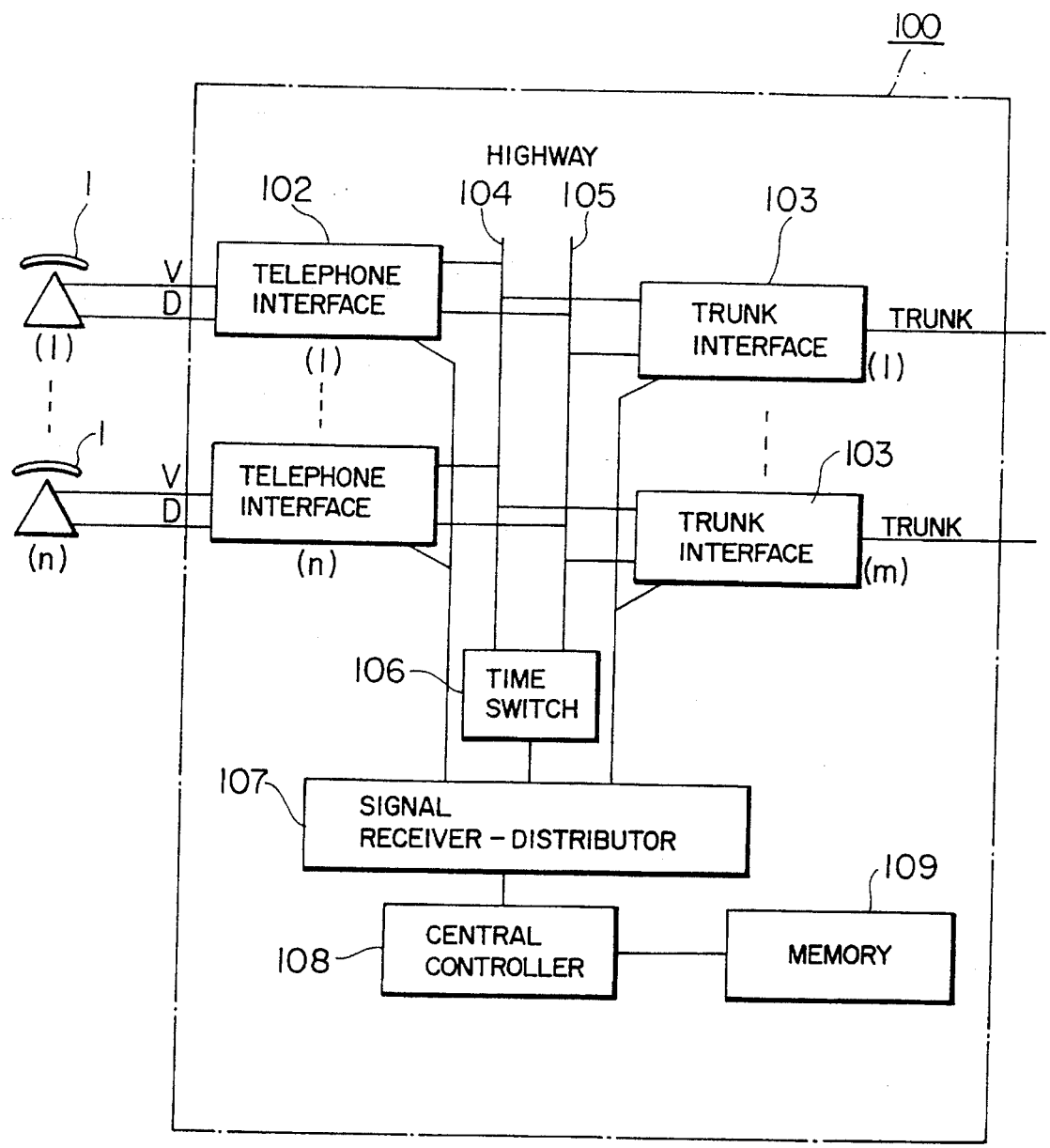
FIG. 3 is a block diagram showing the time division private exchange embodying the present invention.

FIG. 2 shows in block form the internal arrangement of the telephone terminal device shown in FIG. 1, and FIG. 3 shows in block form the arrangement of the time division private exchange.

The private telephone exchange, in general, has classes of service depending on the allowable range of the direct distance dialling (DDD) area from an extension telephone set. This embodiment is assumed to have four classes that are prevalent in U.S.A. and Canada as listed in Table 1.

TABLE 1

| Accessible Area | Classes of Service | | | |
| --- | --- | --- | --- | --- |
| | A | B | C | D |
| Direct outward dialling to all NPA codes area | x | — | — | — |
| Direct outward dialling to specified NPA codes area | x | x | — | — |
| Direct outward dialling to self NPA codes area | x | x | x | — |
| Outside call via attendant operator | x | x | x | x |
| Intra PBX | x | x | x | x | x: allowed —: denied

As shown in FIG. 2, the telephone terminal device 1 is made up of a section including a telephone network circuit 8, a transmitter 9 and a receiver 10, and another section including a push-button dial 3, a magnetic card reader 5, a key-lamp panels 6A and 6B, a display panel 7, an input/output interface 12, a line interface 13, a memory 14 and a character generator 15, all controlled by a controller 11.

In FIG. 3, telephone instruments 1(1) through 1(n) are assumed to have a setup of service class D which enables outside call through an operator call and disables direct outward dialling (DOD) to the DDD networks. The service class is set as extension data in the memory 109 shown in FIG. 3. Each user of the telephone system has an individual magnetic card, which is the portable memory device 4 storing the bearer's identification number and the class of service (one of A–D).

The card bearer is assumed to have an identification number "x" and the unlimited service class "A", and that he or she intends to make a trunk call using a telephone instrument 1(1). If the calling person x makes a trunk call without setting the portable memory device 4 of the magnetic card type in the card reader 5 of the telephone instrument 1, i.e., simply dialling "9", the common procedure of the private exchange will take place, but in this case service class D is set to this telephone instrument as mentioned above, and a DOD call which is detected from the dialling of "9" is disabled. The disabled connection is indicated to the calling person by an audible signal such as a busy tone, or a voice message is issued through a talkie unit. Namely, unless the magnetic card forming the portable memory device 4 is set in the telephone instrument, any DOD calling is disabled, whereby an illegal trunk call can be prevented.

Figure 4A:
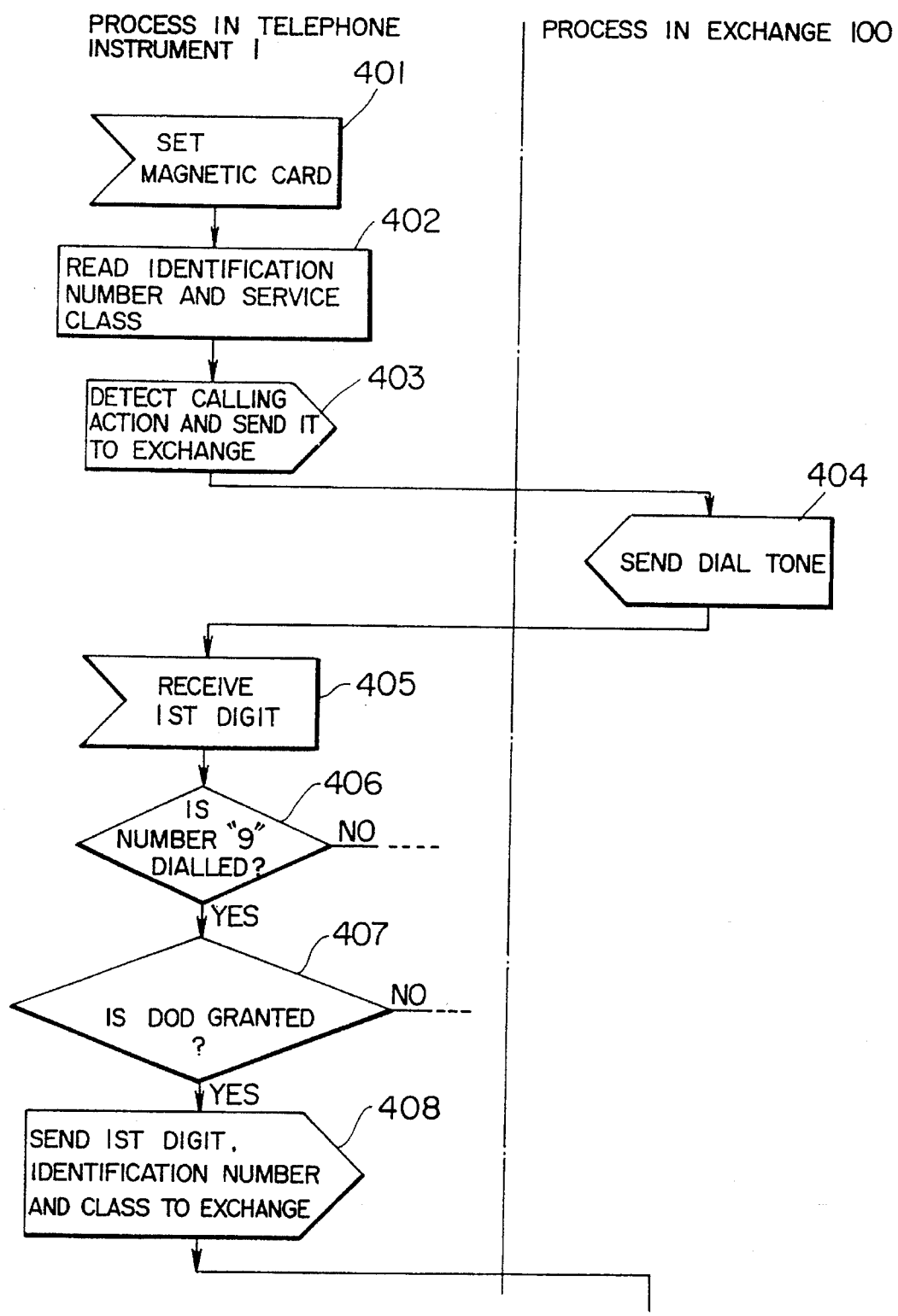
FIGS. 4A and 4B are flowcharts explaining the operation of the system in dealing with the class of service for trunk connection and the affair of charging.
Figure 4B:
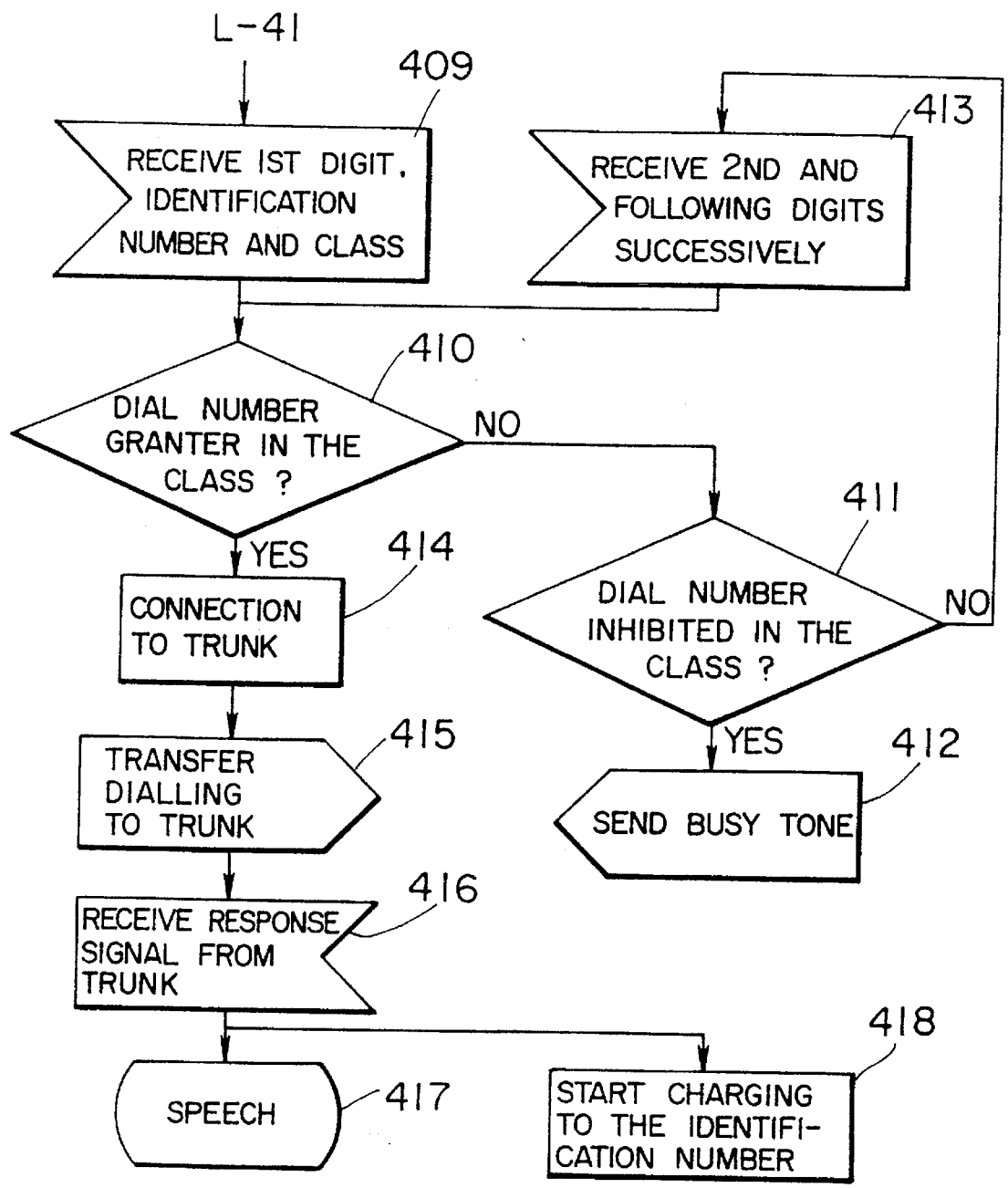

The following describes with reference to the flowcharts in FIGS. 4A and 4B the case of calling by the person x using the telephone instrument 1(1) with the portable memory device 4. First, the person x inserts the portable memory device 4 in the form of a magnetic card in the card reader 5 shown in FIG. 1 (FIG. 4A, step 401). The magnetic card reader 5 shown in FIG. 2 reads the identification number "x" and service class "A" on the card, and sends the information as an electrical signal to the input/output interface 12. The programmed controller 11 receives the identification number "x" and service class "A" from the input/output interface 12 and stores x and A as user's information for that telephone instrument in the memory 14 (FIG. 4A, step 402). The magnetic card reader 5 is capable of detecting the presence of a magnetic card in it, and the stored information is held while the card is placed in the card reader.

Next, the person x lifts the handset, and it is detected by the controller 11 in FIG. 2 through a circuit not shown, and this calling information is transferred through the line interface 13 to the exchange (FIG. 4A, step 403). The telephone instrument 1 is assumed to link to the exchange 100 in FIG. 3 through two pairs of cable including a speech line V and a data transmission line D, and such portions as a power supply circuit which do not directly concern the present invention are eliminated from the drawing.

In FIG. 3, the calling information sent from the telephone instrument 1(1) over the data transmission line D is received by a central controller 108 through a signal receiver-distributor 107 and telephone interface 102, and the control is conducted by the program stored in the memory 109. Then, a dial tone is generated by a circuit not shown, and conducted to the telephone interface 102. The dial tone is sent over the speech line V to the calling telephone terminal device 1(1), so that the calling person is prompted to dial (FIG. 4A, step 404). When the calling person dials the first digit, it is received by the controller 11 through the input/output interface 12 in FIG. 2 (FIG. 4A, step 405), and the dialed digit is determined by the program stored in the memory 14 as to whether or not it is the DOD access number "9" (FIG. 4A, step 406). If the number is found to be "9", the caller's service class which has been stored in the memory 14 is read to check whether the calling person is permitted to establish a DOD connection (FIG. 4A, step 407), and in such a case as this example where service class A is given, the information including the first-digit number "9", identification number "x" and service class "A" is transmitted to the exchange 100 over the same path as used for sending the calling information (FIG. 4A, step 408). Upon receiving the information "9", "x" and "A" (FIG. 4B, step 409), the central controller 108 verifies the service class for the validity of connection (FIG. 4B, step 410), and in this case with the unlimited service class of "A" given to the calling person, the telephone instrument 1(1) is immediately connected to the trunk (FIG. 4B, step 414).

Namely, the central controller 108 selects a vacant time slot on the incoming highway 104 to connect the calling telephone interface 102(1), while at the same time selects a vacant trunk interface 103(1) and a vacant time slot on the outgoing highway 105 so as to establish the connection between the lines, and connects both time slots of the selected incoming and outgoing highways 104 and 105 at the time switch 106. Similarly, connection is made from the telephone interface 102(1) to the outgoing highway 105, to the time switch 106, to the incoming highway 104, and to the trunk interface 103(1), so that a bidirectional speech path is established.

If the calling person dials "9" without using the magnetic card, i.e., in a status of service class D, it is ignored. When the calling person has a service class of B or C instead of A, the decision step 410 in FIG. 4B is negated, and a test is conducted as to whether or not the first dialling matches the service class B or C (FIG. 4B, step 411). If the test result is negative, a busy tone is sent to the calling telephone instrument (FIG. 4B, step 412), or otherwise a pseudo dial tone is issued prompting the calling person to dial the next digit so as to verify the second dialling. When the calling person x dials the second digit, i.e., the first digit to the trunk, it is received (FIG. 4B, step 413) and transmission of the pseudo dial tone is stopped while the validity of the service class is verified. Subsequently, the third digit, i.e., the second digit to the trunk, is received, and the service class verification is conducted in the same way (FIG. 4B, step 410).

Table 2 shows the formats of the trunk and local telephone number system used in the U.S.A.

TABLE 2

|  | 1 | 2 | 3 | 4 | 5 | 6 | 7 | 8 | 9 | 10 |
|---|---|---|---|---|---|---|---|---|---|---|
| Trunk telephone number | N | 0/1 | X | N | N | X | X | X | X | X |
| Local telephone number | N | N | X | X | X | X | X |  |  |  | where N takes one of 2 though 9, and X takes one of 0 through 9.

Accordingly if the third digit is a number other than "0" and "1", the telephone instrument is immediately connected to the trunk (FIG. 4B, step 414), or if the third digit is "0" or "1" with a caller's service class of C, the test result of step 411 is affirmative, causing the process to go to step 412 for the transmission of a busy tone to the calling telephone instrument. When the third digit is "0" or "1" with a service class of B, the validity cannot be determined by the step 411 in FIG. 4B, and the verification is conducted following the reception of a subsequent digit (FIG. 4B, steps 413 and 410), and the operation is repeated until the final decision is made.

After the telephone instrument is connected to the trunk following the allowance of a connection, the second and later digits dialed by the calling person are regenerated and transmitted to the trunk (FIG. 4B, step 415). When the called person takes a response and an answer signal comes in through the trunk, the central controller 108 receives it through the trunk interface 103 and signal receiver-distributor 107 (FIG. 4B, step 416), and a speech communication is established between the calling person and the called person (FIG. 4B, step 417). The exchange 100 increases the message account for the identification number "x" in the charging memory (FIG. 4B, step 418).

As described above, whereas conventionally the service class which should be atributive to the individual person is fixed to the telephone instrument, resulting in the inconvenience that a person allowed to make a trunk call cannot do so using a telephone instrument classified "C", or a person not permitted to make a trunk call is unrestrained to call anywhere using a telephone instrument classified "A", the present invention solves this problem through the use of identification cards held by individual persons so that the service class of each telephone instrument can be changed depending on the personal information memorized on the card.

In many cases, the telephone fee is administered independently in each department of an enterprise. In the conventional charging system where a toll is charged to each telephone instrument, a call made by a person using a telephone instrument owned by another department is charged as if a person in that department has made that call, posing a problem that the amount of the fee does not always reflect reality. According to the present invention, tolls are charged not to each telephone instrument, but to each identification card, i.e., individual user, and the above problem is solved.

Although in the foregoing embodiment an attempt of calf without use of the identification card is given service class D, the class may be set arbitrarily.

The service class itself is not limited to the connection to the trunk. For example, a class capable of breaking in on an already established connection, as called "executive override" can also be applicable. Although the above embodiment has been described as an example for the private exchange, the present invention is also applicable to the public communication network. For example, when a variety of services such as the connection to the international network and the connection between a telephone network and a data transmission network become accessible on the basis of the service contract, the user can benefit from these services using any telephone instrument or terminal device by introduction of the card system.

Since the calling person is identified, the toll can be added to one's own account by transferring the charging information to the exchange office to which the calling person belongs. This can readily be practiced when CCIS (Common Channel Interoffice Signaling) system prevails domestically. For example, when the inventive card charging system is applied to public telephone units, the user can make a call for unlimited length without using coins, and can pay for the total amount of fee by the monthly issued bill. The system will particularly be useful for a business call.

Although in the foregoing embodiment the portable memory device has a record of the identification number and service class, only a record of the identification number may be provided on the card in the case of a small service area such as within the private exchange which can easily find the service class by making reference to a table in the memory device, thereby to offer the same quality of service. However, for a nationwide system, such as a nationwide telephone network, it is too awkward to make an inquiry of the service class table registered in the specific local exchange office, and it will be more effective to store the service class on the identification card.

Next, the second practical embodiment of this invention applied to an automatic dialling system will be described using the key-lamp panel layout diagram shown in FIG. 5 and the flowcharts shown in FIGS. 6A and 6B. Each lamp section of the key-lamp panel 6B shown in FIG. 1 is made up, for example, of a dot-matrix display device as shown by 61 in FIG. 5 associated with a key switch 62. The portable memory device 4 in the form of a magnetic card storing the identification number is inserted in the card reader 5 shown in FIG. 1 (FIG. 6A, step 601). The card reader 5 in FIG. 2 reads the record on the magnetic card, and it is sent through the input/output interface 12 to the controller 11 and stored in the memory 14 (FIG. 6A, step 602).

Figure 5:
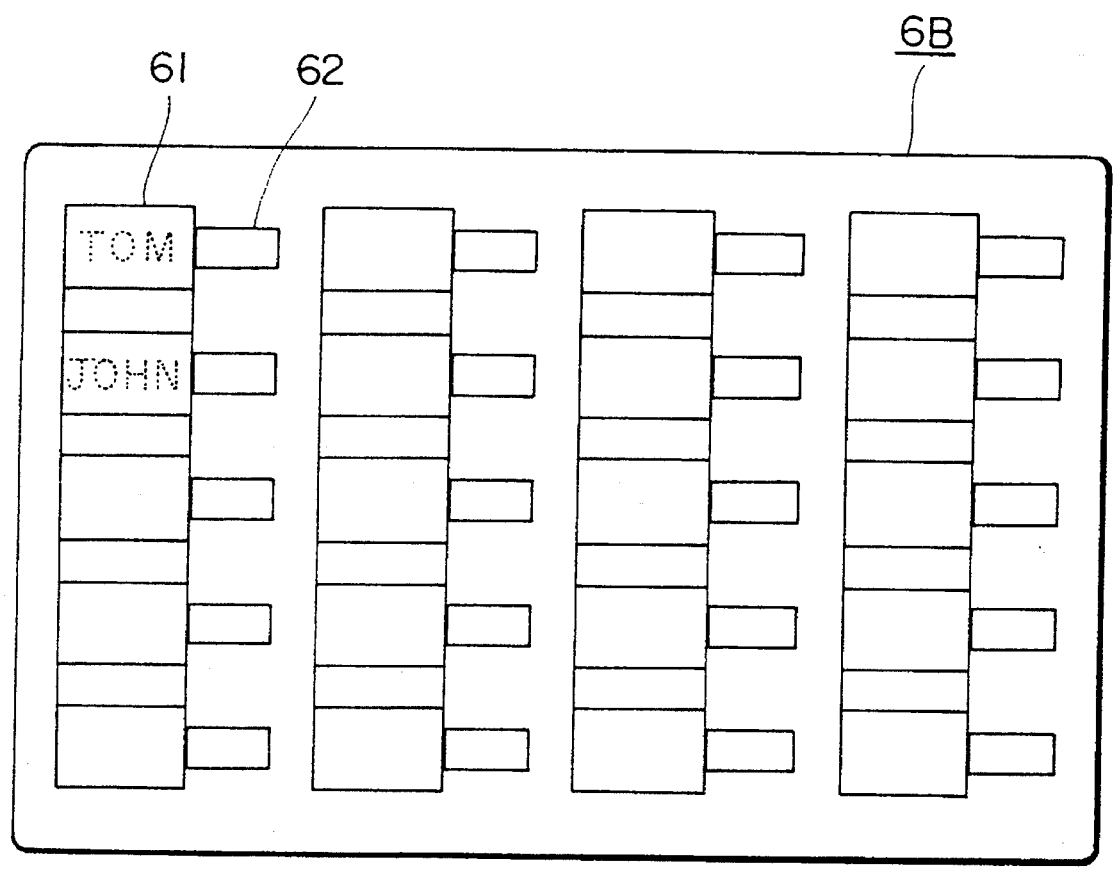
FIG. 5 is an illustration showing an example of the key-lamp panel 6B provided on the telephone terminal device shown in FIG. 1.
Figure 6A:
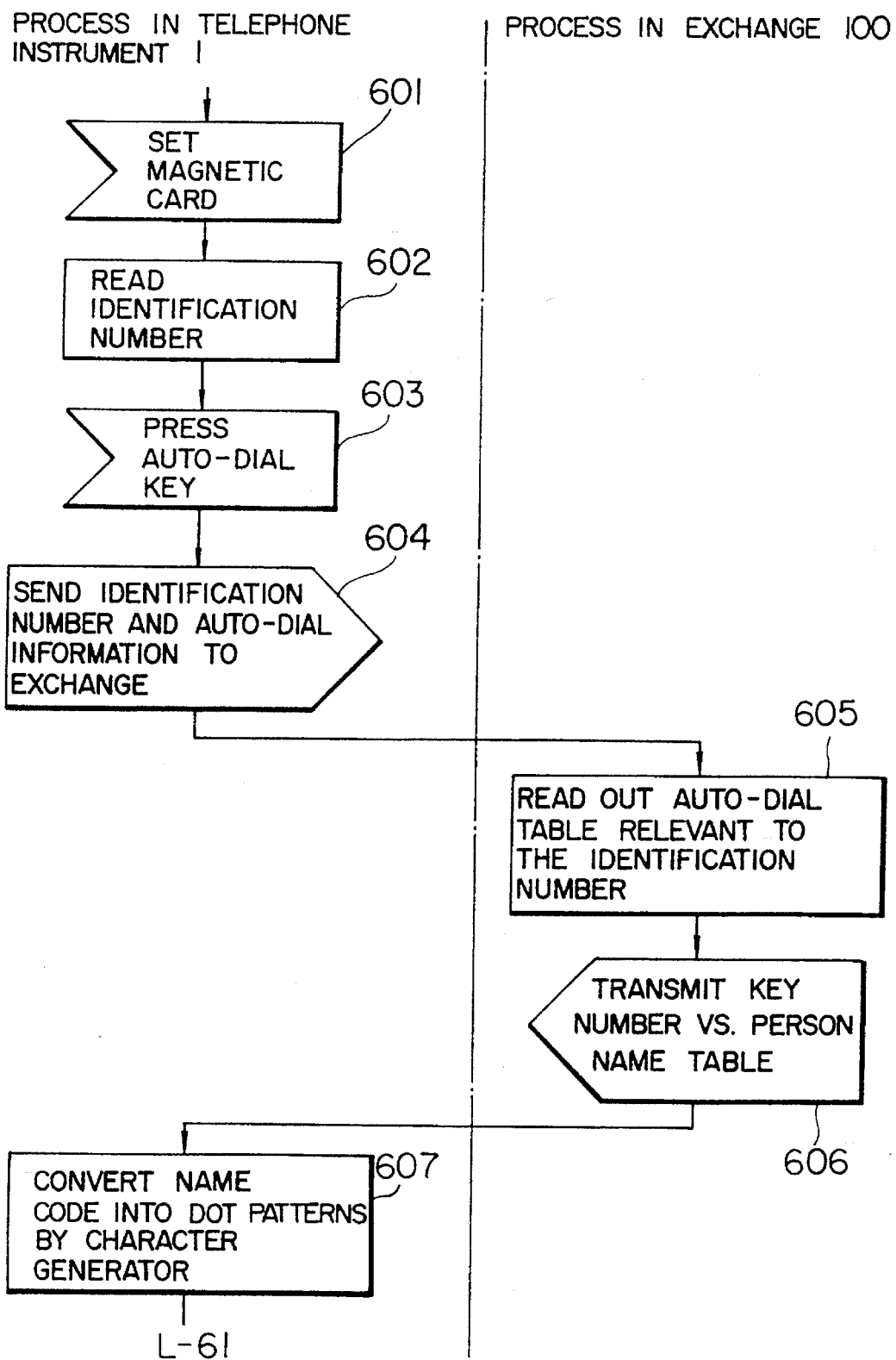
FIGS. 6A and 6B are flowcharts explaining the operation of automatic dialling.
Figure 6B:
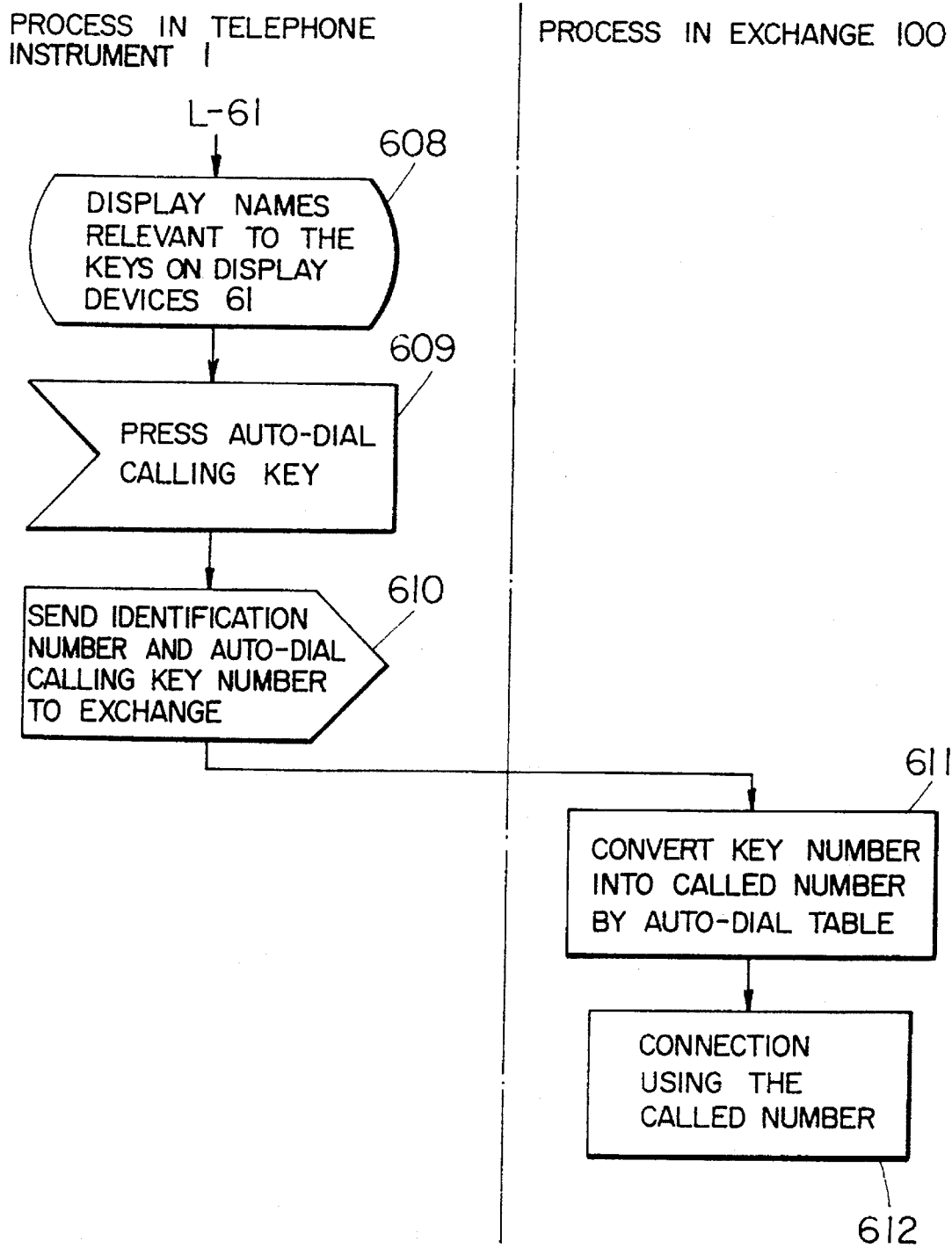

The key-lamp panel 6B shown in FIG. 5 is a multipurpose keyboard whose function is controlled by software, and to make a key-entry for automatic dialling, one of keys on the key-lamp panel 6A in FIG. 1 is specified in advance as an AUTO-DIAL key. Thus, the AUTO-DIAL key is pressed (FIG. 6A, step 603). The controller 11 (FIG. 2) detects the key-entry through the input/output interface 12, and reads out the identification number stored in the memory 14, and transfers it together with the information on the entry of the AUTO-DIAL key through the line interface 13 to the exchange 100 (FIG. 6A, step 604). Upon receiving the identification number through the telephone interface 102 and signal receiver-distributor 107, the central controller 108 reads out the auto-dial information for that identification number, i.e., the key number vs. person's name table, in the auto-dial table in the memory 109 (FIG. 6A, step 605), and sends it back to the telephone instrument on the same route as for receiving the identification number (FIG. 6A, step 606). Upon receiving the key number vs. person's name table from the line interface 13, the controller 11 in FIG. 2 transforms the name code into character information using the dot patterned character generator 15 (FIG. 6A, step 607), and displays it on the character display devices 61 on the key-lamp panel 6B in correspondence to the keys (FIG. 6B, step 608). The calling person views the person's names displayed on the key-lamp panel 6B, and presses a key 62 (FIG. 5) corresponding to the desired person's name (FIG. 6B, step 609). The controller 11 detects the key number of the pressed auto-dial calling key 62, and transfers the identification number which has been stored in the memory 14 and the auto-dial calling key number to the exchange 100 (FIG. 6B, step 610). In FIG. 3, the central controller 108 makes reference to the auto-dial table in the memory 109 so as to identify the desired telephone number corresponding to the identification number and key number (FIG. 6B, step 611), and makes a connection to the called telephone instrument of that number (FIG. 6B, step 612).

In this embodiment, the exchange has a conversion table for automatic dialling and the portable memory device stores only the identification number, and therefore the key and called person relationship for automatic dialling can readily be changed even if the memory device is made in the form of a punched card instead of a magnetic card. However, in the case of a nation-wide public communication network, it is necessary to read out the automatic dialling conversion table registered in the specific local exchange, and therefore the provision of a magnetic card with the automatic dialling conversion table memorized thereon is more practical.

Namely, the magnetic card has stored therein personal data, such as a record of the key numbers for automatic dialling, the called persons' names and their telephone numbers. The telephone terminal device reads out this information and displays the names on the display devices corresponding to the key numbers, and when a key is pressed, the telephone instrument transmits the corresponding telephone number over the line. In this case, since the communication network is not directly involved in the automatic dialling system, the automatic dialling service for individual persons is made possible through the installation of terminal devices of this function.

When the system is applied to a nationwide public communication network, the magnetic card is provided with a record of all-digit number including NPA code, and the communication terminal device stores the NPA code in which it belongs, so that when the NPA code read out on the magnetic card coincides with the NPA code stored in the device, the NPA code should be skipped.

The embodiment shown in FIG. 5 has 20 keys for automatic dialling and up to 20 persons can be registered. In order to register more than 20 persons, one of the keys on the key-lamp panel 6A in FIG. 1 is used to advance the page of the table in the memory, so that another 20 persons can be selected by pressing this key, and thus the number of persons registered is independent of the terminal device hardware, but solely dependent on the memory capacity of the magnetic card.

Although the use of a magnetic card for the portable memory device has been described, other forms of memory device such as an electronic memory card incorporating an IC memory, optical memory card, and composite pocket calculator prevalent by the name of "data bank" or "electronic memo" may be used.

Although in the second practical embodiment each automatic dialling key is combined with a character display device, the same purpose is achieved by an orderly arrangement of the keys on the automatic dialling device and person's name labelled on the card correspondingly.

The arrangement for abbreviated dialling in place of automatic dialling is merely the replacement of the automatic dialling keys with dialling of several digits, and the above embodiment can directly be used.

Next, the third practical embodiment of the invention will be described with reference to the flowchart shown in FIGS. 7A and 7B. By using the inventive personal information card, the calling person's name can be displayed on the called telephone instrument. Displaying the calling telephone number on the called telephone instrument in advance of making response has been practiced experimentally or for a limited purpose. However, the calling telephone number does not necessarily identify the calling person. This system is effective when used in a hotel, where each telephone instrument is given a number equal to its room number, so that the calling room is indicated. However, this function is not very valuable when used in an office where not all of the members have their own telephone instruments, and where people frequently walk from one place to another and do not always make a call from one's own telephone instrument, and therefore the effectiveness of the system is not as high as expected.

By using the inventive personal information card constituting a portable memory device which is always set in a telephone instrument when making a call, the exchange reads the identification number on the magnetic card, whichever telephone instrument is used, and can readily display the identification number or person's name on the called telephone instrument.

In this practical embodiment, all members of the office carry a magnetic card having a record of their individual identification number (e.g., membership number). This card can be at the same time the membership certificate. The telephone instrument 1 is provided with a magnetic card reader as shown in FIG. 1. The calling person inserts the portable memory device 4 in the magnetic card reader 5 (FIG. 7A, step 701), and lifts the handset 2. The controller 11 shown in FIG. 2 detects the call origination, i.e., the lift of the handset 2, by a circuit not shown (FIG. 7A, step 702), and operates on the magnetic card reader 5 to read the identification number recorded on the card (FIG. 7A, step 703). The identification number read by the card reader 5 is transferred through the input/output interface 12 to the controller 11, which in turn transmits the information of call origination together with the calling person's identification number to the exchange 100 via the line interface 13 in accordance with the program stored in the memory 14 (FIG. 7A, step 704).

The magnetic card reader 5 has a card detector 5' to detect the presence of a card, and if no card is inserted in the card reader, it transmits a code indicating the absence of a card to the exchange. In the exchange 100, the central controller 108 shown in FIG. 3 receives these signals through the telephone interface 102 and signal receiver-distributor 107, and transmits a dial tone to the calling party by taking the dial tone connection (FIG. 7A, step 705). On the other hand, the central controller 108 converts the received identification number into the calling person's name by making reference to a conversion table stored in the memory 109 (FIG. 7A, step 706), and stores it temporarily in the memory 109. When the code representing the absence of a card is received, the process for displaying the calling person's name does not take place, but only the usual speech path connection takes place.

The calling person hears the dial tone and dials the number of the called party. The dialled number is relayed by the telephone instrument 1 and transmitted to the central controller 108 in the exchange 100 via the same route as for transmitting the calling information and identification number (FIG. 7A, step 707). The central controller 108 selects a vacant speech path between the calling party and called party (FIG. 7A, step 708), and reserves the speech path. Subsequently, a ringing tone is transmitted to the calling telephone instrument and a ringing signal is transmitted to the called telephone instrument (FIG. 7A, step 709).

Figure 7A:
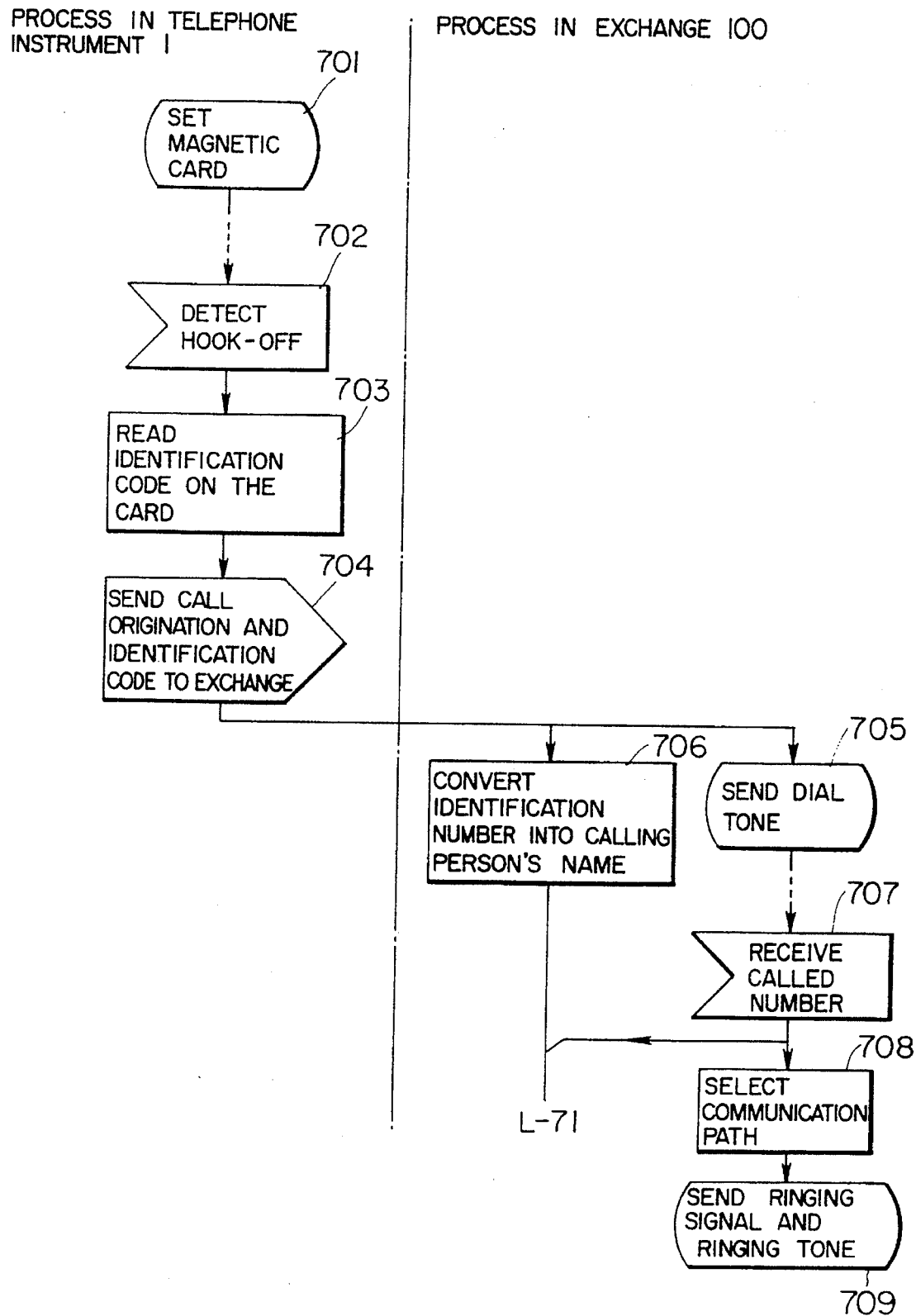
FIGS. 7A and 7B are flowcharts explaining the operation for displaying the calling person's name on the called telephone instrument.
Figure 7B:
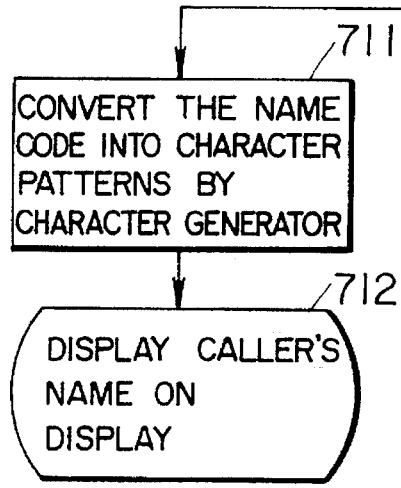

At a time point when the telephone instrument to be called is determined (or, alternatively, when the speech path is selected and the ringing signal is transmitted), the central controller 108 reads out the calling person's name from the memory 109, and transfers it in the form of character code through the signal receiver-distributor 107 and telephone interface 102 to the called telephone instrument (FIG. 7B, step 710).

Upon receiving the character code of the calling person's name through the line interface 13, the controller 11 of the called telephone instruments 1 converts the character code into dot patterns using the character generator 15 (FIG. 7B, step 711) and transfers it through the input/output interface 12 to the display panel 7. The display panel 7 memorizes the dot patterns of the caller's name and displays it as characters (FIG. 7B, step 712). Accordingly, the called telephone instrument has a display of the calling person's name when it is ringed, allowing the called person to know the caller before taking a response.

Although in the above embodiment the magnetic card has a record of the identification number, the bearer's name may be recorded instead in a coded form, and in this case the conversion process in step 706 of FIG. 7A becomes unnecessary. Using an advanced speech synthesizing technique involving a speech synthesizer 110, as seen in FIG. 3, it is also possible to transform the calling person's name into a vocal message in the exchange 100 so that the called person is notified of the caller's name in a audible manner using a speaker built in the telephone instrument or a separate speaker.

Next, the fourth practical embodiment of the invention will be described with reference to FIG. 8 showing the system in which a private exchange is connected with a mail system. Recently, a variety of mail services such as electronic mail and vocal mail have been put into practice, and the present invention is also effective in this field. In the known mail system, a mail box, i.e., a memory, is provided corresponding to each telephone instrument (the memory may be a part of the system common memory), and a mail addressed to a telephone instrument is stored in the memory, which is accessed by the telephone instrument through the operation. For the confidential security of communication, the mail box is generally unlocked by a pass word and the like.

By application of the present invention to the mail system, the mail boxes can be provided in correspondence to individual persons, instead of telephone instruments, allowing each person to make access to one's mail box using an arbitrary telephone instrument. Each person bears a magnetic card with a record of the personal identification number, preferably in a cryptographic code for the purpose of confidential security.

In FIG. 8, the portable memory device 4 in the form of a magnetic card is inserted in the magnetic card reader 5 so that the identification number recorded on the card is read and transmitted to the central controller 108 in the exchange 100, as in the case of the third practical embodiment. When the calling person takes a mail read-out action through a button or dial, the central controller 108 connects the calling telephone instrument to a vacant mail trunk 110 through the connecting network 113 so as to establish the connection to a mail box 212 corresponding to the caller's identification number, and at the same time the caller's identification number is transferred to the controller 211 in the mail system 200. Thereafter, the mail service of the known method proceeds within the mail system 200. For the mail service, the telephone instrument 1 includes a display unit when necessary.

Although in the above embodiment the mail service is offered through arbitrary telephone instruments, it is also possible to restrict the mail read-out capability to specified telephone instruments. Namely, the central controller 108, which deals with the positional information of the calling telephone instrument 1 on the exchange 100 for making connection, can correlate the telephone instrument with the caller's identification number so as to determine whether the telephone instrument is permitted to make connection with the mail system. Accordingly, through the registration of telephone instruments allowed for mail read-out, the mail read-out service can be conducted selectively by correlating the positional information with the caller's identification number. In addition to the mail service through an arbitrary telephone instrument using a magnetic card, it is also possible to register one's own telephone instrument so that it is effective for the service without use of the card.

Although the fourth practical embodiment employs the magnetic card system, any type of portable memory device may be used, and the communication service is not limited to a telephone system, but the present invention is also applicable to data communication, and therefore the telephone instrument described above can be expanded to general communication terminal devices. Although in the above practical embodiment the personal identification number is recorded on the portable memory device, the record may be any personal data, and the servicing process may be carried out either in the communication terminal device or in the central controller, without affecting the essence of the present invention.

Moreover, when a communication terminal device capable of intelligent processing through a custom-made program is available, the user can call the program to an arbitrary terminal device using a pass word recorded on one's portable memory device, whereby the user can use the terminal as if it is one's own terminal.

As mentioned previously, the conventional service belongs to the communication terminal device, and not to the individual user. Therefore, any person can access a sophisticated communication service by using a communication terminal device which is granted for that service, while on the other hand a person eligible for accessing a sophisticated communication service cannot have a service through a terminal which is not granted.

According to the present invention, as described in the foregoing four typical embodiments, a portable memory device with a record of personal information is prepared and held by each person eligible for a specific communication service, who sets the device on an unspecified communication terminal device, which reads the personal information recorded on the portable memory device and enables a person-oriented communication service. Whereas the conventional communication service belongs to the terminal device, the present invention enables communication services which belong to the individual person, and the effectiveness of the invention is unlimited.

According to the present invention, in contrast to the conventional automatic dialling or abbreviated dialling in which calling keys or abbreviated numbers are made correspondence fixedly to called telephone numbers, personal information is recorded on the portable memory device which is carried by each person, whereby the automatic dialling service and abbreviated dialling service can be offered in such a useful manner as if the person carries one's own automatic dialling device or telephone instrument.

In addition, the inventive system allows the called person to know the caller's name, not the calling telephone number, whichever telephone instrument is used by the calling person, thereby providing the right of choice of response for the called person, whereby the efficiency of office work can be improved.

I claim:

1. A personal-servicing communication system comprising a plurality of communication terminal devices and a portable memory device for memorizing personal data to control said communication terminal devices, wherein, each of said plurality of communication terminal devices comprises:

at least one multi-purpose keyboard having keys whose functions are controlled by software;

indication means positioned near the keys of said multi-purpose keyboard for indicating respective character code information for respective keys;

means for reading out said personal data from said portable memory device;

memory means for storing personal data read out from said portable memory device; and means, responsive to said personal data stored in said memory means, for setting keys of said multi-purpose keyboard to a condition for effecting a communication connection specific to said personal data under software control and for controlling said indication means to indicate respective character code information for respective keys related to a respective communication connection condition for which the respective keys are set.

2. A personal-servicing communication system according to claim 1, wherein said communication function to which said multi-purpose keyboard is set is an auto-dial function, and said character code information indicated by said indication means consists of called party identifications specified by said personal data.

3. A personal-servicing communication system according to claim 1, wherein said indication means is incorporated into said multi-purpose keyboard and includes a plurality of display devices for indicating character code information for respective keys of the keyboard.

4. A personal-servicing communication system according to claim 3, wherein said communication function to which said multi-purpose keyboard is set is an auto-dial function, and said character code information indicated by said indication means consists of called party identifications specified by said personal data.

5. A personal-servicing communication system comprising a plurality of communication terminal devices and a portable memory device for memorizing personal data to control said communication terminal devices, wherein each of said plurality of communication terminal devices comprises:

at least one multi-purpose keyboard having keys whose functions are controlled by software;

indication means for indicating respective character code information for respective keys;

means for reading out said personal data from said portable memory device;

memory means for storing personal data read out from said portable memory device; and means, responsive to said personal data stored in said memory means, for setting keys of said multi-purpose keyboard to a condition for effecting automatic dialing based on said personal data under software control and for controlling said indication means to indicate respective character code information to identify a called party for respective keys related to said automatic dialing for which the respective keys are set.

6. A personal-servicing communication system according to claim 5, wherein said indication means comprises a plurality of display devices, each disposed adjacent to a respective key, for displaying character code information.

* * * * *